United States Patent [19]
Thompson, Jr.

[11] Patent Number: 4,820,032
[45] Date of Patent: Apr. 11, 1989

[54] AUTOMATED ANGULATING MIRROR

[76] Inventor: Robert W. Thompson, Jr., 1125 University St., Clarkston, Wash. 99403

[21] Appl. No.: 86,645

[22] Filed: Aug. 18, 1987

[51] Int. Cl.⁴ .......................... B60R 1/06; B60R 1/08; G02B 7/18
[52] U.S. Cl. ..................................... 350/605; 350/637
[58] Field of Search ................................. 350/605, 637

[56] References Cited
U.S. PATENT DOCUMENTS

| | | |
|---|---|---|
| 3,469,901 | 9/1969 | Cook et al. ......................... 350/605 |
| 3,527,528 | 9/1970 | McKee et al. ...................... 350/605 |
| 3,536,382 | 10/1970 | McKee et al. ..................... 350/605 |
| 3,640,608 | 2/1972 | McKee et al. ...................... 350/605 |
| 3,640,609 | 2/1972 | McKee et al. ...................... 350/605 |
| 3,749,480 | 7/1973 | DeWitt et al. ..................... 350/605 |
| 3,950,080 | 4/1976 | McKee et al. ...................... 350/605 |
| 4,609,245 | 9/1986 | McKee et al. ...................... 350/605 |

*Primary Examiner*—Jon W. Henry

[57] ABSTRACT

An automated angulating mirror controlled through electronics, hydraulics, and pneumatics, to view the movements of a vehicle in respect to a trailer pivotably mounted.

7 Claims, 3 Drawing Sheets

Fig 1

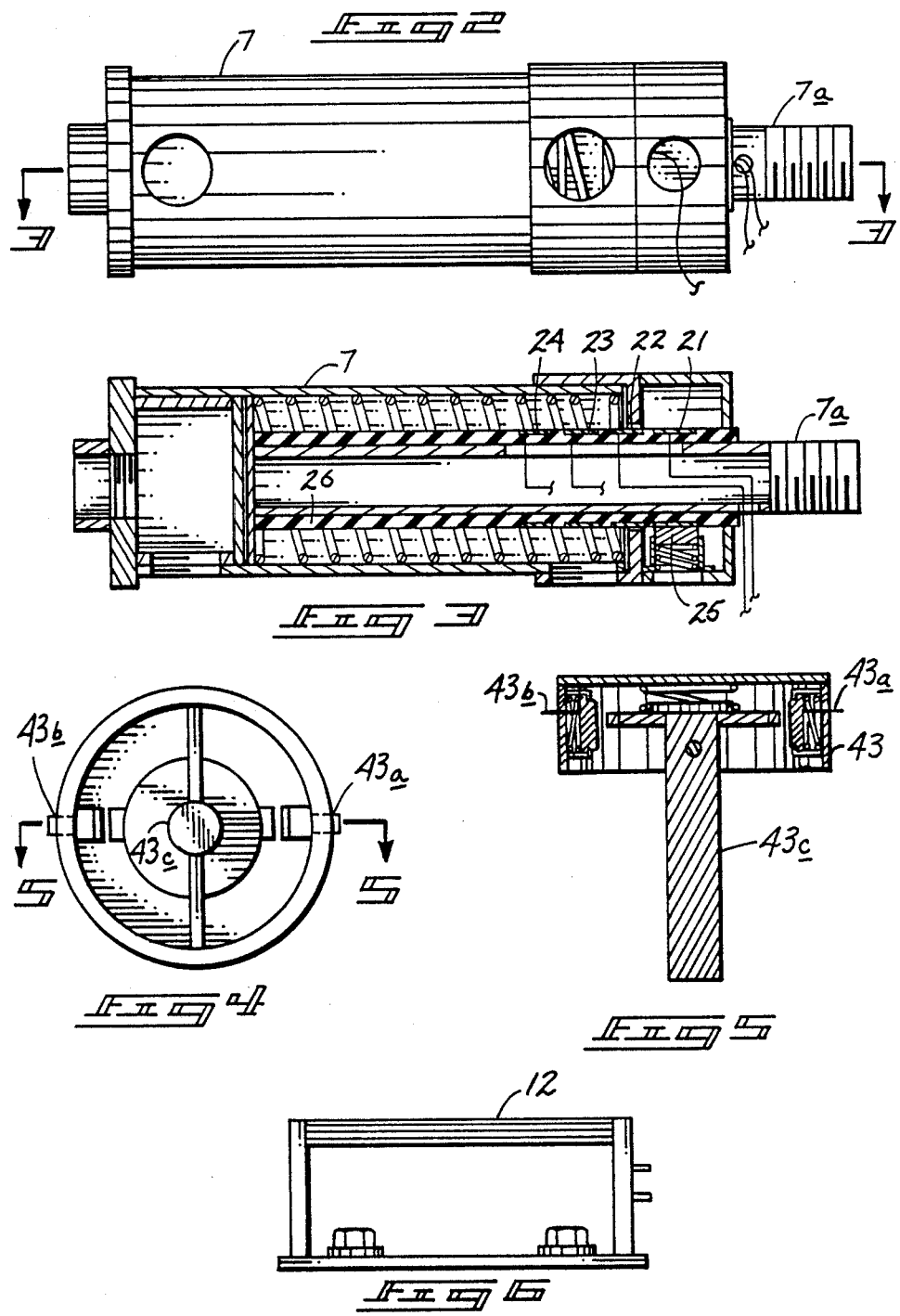

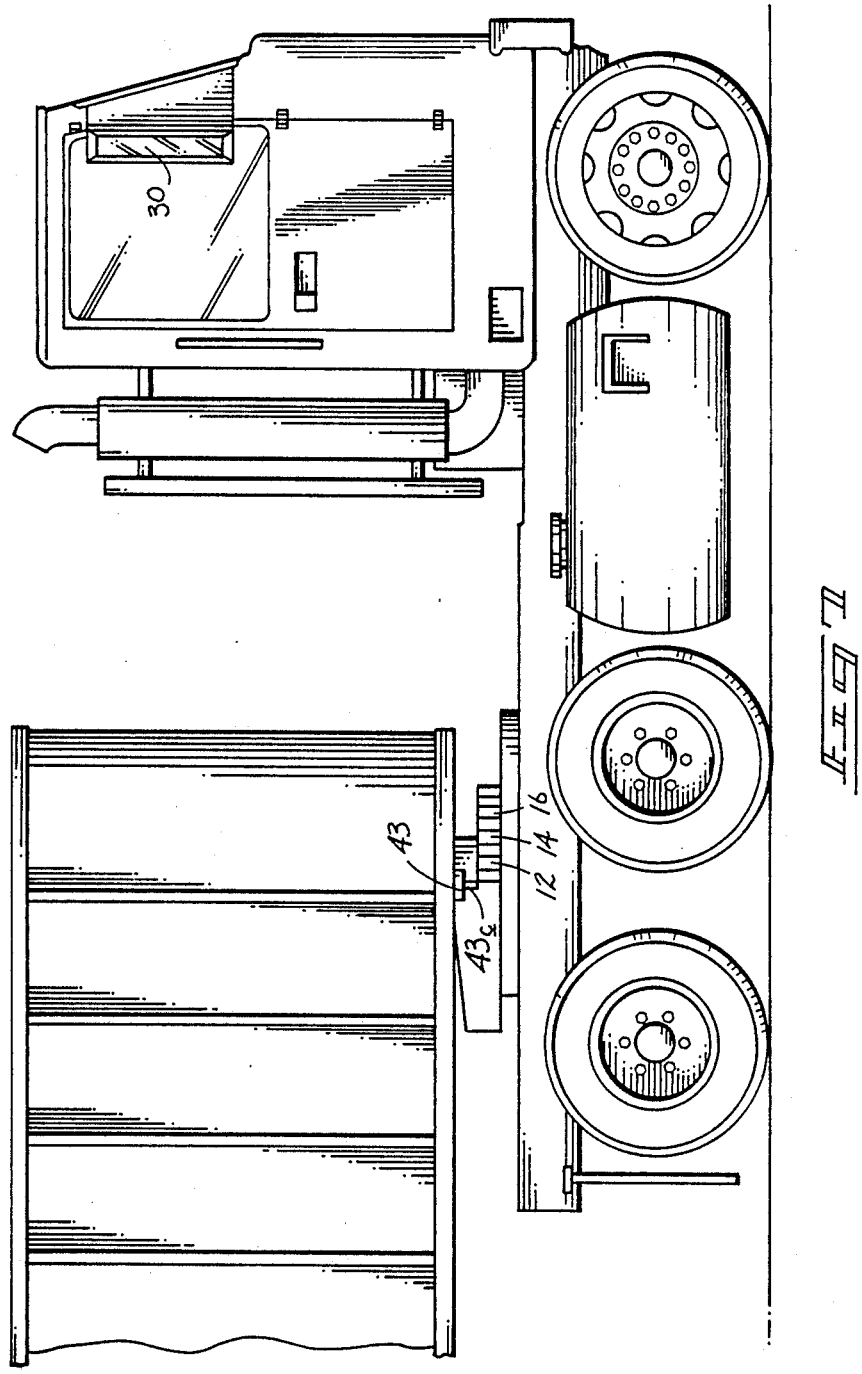

AUTOMATED ANGULATING MIRROR

BACKGROUND OF THE INVENTION (1) Field of the Invention

The present invention pertains generally to the field of automated mirrors and more particular to a vehicle with a pivotable mounted trailer.

(2) Description of Prior Art

The prior art known to the applicant is listed by way of illustration, but not of limitation, in separate communications to the U.S. Patent Office. The present invention exemplifies improvements over the prior art.

More particularly U.S. Pat. No. 4,609,265 disclosing an electronic actuated device to be mounted to existing mirrors mounted upon a vehicle. The mounting of which allows no means for overcoming wear within the physical structure of the mirrors design.

SUMMARY OF THE INVENTION

The automated angulating mirror controls viewing of a trailer pivotably mounted upon a vehicle.

The system is controlled through the combination usage of electronics, hydraulics, pneumatics and optional air. Each of which, work in unison, control mirrors travel movements; inward and outwards, in respect to the vehicle and its trailer, at predetermined intervals. The automated system will be enclosed in a single unit. The internal components, contained within the unit body, will include hydraulic fluid, a self contained reservoir, a motor; to drive the fluid, an electric hydraulic cylinder, pneumatic solenoid valves, with optional air actuated cylinders; viewed in the drawing disclosed. The mirror will be bushed to prevent excessive wear. The enclosure preventing weather conditions from damaging the internal components.

Components of operation not contained within the unit body include the biased switching means, the systems override, an optional air compressor, and air holding tank.

The features of the present invention are believed to be novel and are set forth; with particularity, in the appended claims. The invention both as to the objects and advantages; thereof, may best be understood with reference to the following drawings; in which, like reference characters, refer to like elements in several views.

BRIEF DESCRIPTION OF DRAWINGS

The present invention is described with a detailed description of the following art;

FIG. 1 Complete functional systems layout format;

FIG. 2 External side view of the electrical hydraulic cylinder; relative to, FIGS. 1 and 3;

FIG. 3 Internal cut view of the electrical hydraulic cylinder; as seen from, line 3—3 of FIG. 2;

FIG. 4 Bottom view of the dual pivot points shown, FIGS. 1, 5 and 7;

FIG. 5 Internal cut view of the dual pivot points; as seen from, line 5—5 of FIG. 4;

FIG. 6 Side view of a pivot point contact bar; within, FIGS. 1 and 7; and

FIG. 7 Side view of truck's fifth wheel mounting and its mirror system; internally shown, FIG. 1.

DESCRIPTION OF THE PREFERRED EMBODIMENT

Figure 1:
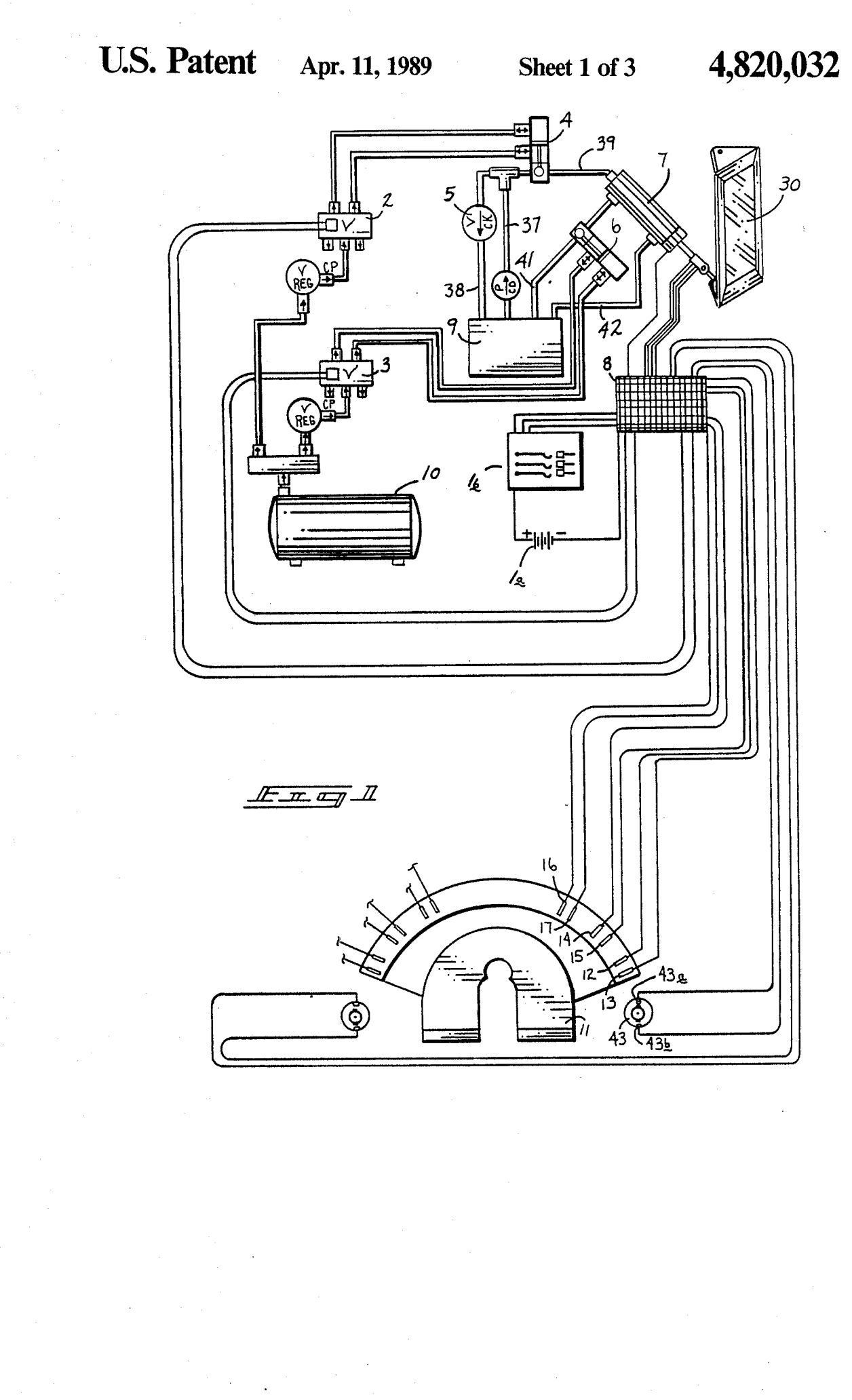

The automation operation of the Angular Mirror 30; FIG. 1, FIG. 7; is illustrated as a right hand mirror and is controlled through the combination of three functions; air, electronics, and hydraulics. Each of these functions work together controlling its movements.

Cylinder 7; FIG. 1, is the motion cylinder, with an external view shown in FIG. 2, and an internal view shown in FIG. 3. The internal piston shaft 7a; shown in the internal view FIG. 3; with a rubber insulator 26, prevents grounding electrical bushings 21, 22, 23, 24. The electrical brush 25 is in direct contact with one of the electrical bushings, at all times, unless ball valve 4; FIG. 1, fails to close. If ball valve 4 fails to close, an emergency escape fluid return line 42 returns fluid to tank 9; FIG. 1.

The operation of air solenoid valves 2 and 3; FIG. 1, are controlled by the following:

Wires extending from the electrical bushings 21 through 24; connected through circuit board 8; FIG. 1, to the pivot point contact bars 12 thru 17; FIGS. 1, 6 and 7; with FIG. 6 being a sideview of one bar; located concentrically around truck fifth wheel 11; FIG. 1, which are on the ground side of the circuit. The positive side; of the circuit controls power from battery 1a, through the switch on the dash 1b; FIG. 1, to add power to the air solenoid valves 2 and 3; thru the pivot point contacts 43a or 43b; FIGS. 1, 4, and 5, of dual pivot points 43.

The outward motion of mirror 30 is controlled through the operation of air solenoid valve 2, and cylinder 7. Air is supplied from air tank 10, through one-half of the air solenoid valve, to the top of ball valve 4; FIG. 1, holding it closed. While ball valve 4 is closed, fluid from tank 9 is pumped through fluid line 37; FIG. 1, through check valve 5; returning through fluid line 38, back to the reservoir in tank 9. The wiring from contact bushings 21 thru 23, within shaft 7a; FIG. 3, connect in order to the electrical pivot point contact bars 12, 14, and 16. The outward motion wiring order is 21 to 12, 22 to 14, 23 to 16; through circuit board 8, (FIG. 1).

As the truck begins to angulate the trailer causes pivot point bar 43c to make contact with bar 12. The point on 43c closes to make contact with spring loaded point 43a. This action; with the switch on the dash 1b being in the on position, creates a complete circuit through the air solenoid valve (2), causing its internal piston to shift.

Upon the shifting of the air solenoid's piston, air trapped within ball valve 4 is forced out; exhausting through a port in the air solenoid valve (2). An in-rush of air opening ball valve 4, allows fluid to pass through line 39 to cylinder 7. As the fluid flows into cylinder 7 it is blocked from leaving it, due to ball valve 6 being closed, forcing piston shaft 7a outward.

As piston shaft 7a moves outward, brush 25 passes its contact with electrical contact bushing 21, causing a collapse in the circuit. As the circuit is broken air solenoid valve 2 once again shifts its piston; exhausting, thru another port, the air from ball valve 4; reversing ball valve 4 closed, from air in rushing from tank 10. The closing of ball valve 4; again, opens check valve 5; returning the circulating fluid to tank 9 through line 38. Upon the pivot points 43 passing bar 12; continuous outward operation of mirror 30 will depend on the contact of pivot point contact bar 14; via, 15, and 16; via 17, etc . . . .

The automatic inward motion, of mirror 30, is controlled by the straightening of the truck's angulation by means of pivot point bar 13; via, 12; etc . . . and dual points 43.

The wiring within cylinder 7, on shaft 7a, is wired so electrical contact bushing 22, 23, 24 are, through circuit board 8, wired to pivot point contact bars 13, 15, 17, FIG. 1. An example of the wiring is thus; electrical contact bushing 22 is wired to pivot point contact bar 13; 23 to 15; and 24 to 17. Contact point 43b is wired through air solenoid valve 3.

As the truck straightens the pivot points on bar 43c; FIGS. 4, and 5, contact bar 13, closing points 43c and 43b; spring loaded, creating a circuit through air solenoid valve 3, (FIG. 1). The circuit creates a shifting in the air solenoid's piston upon activation. Air; supplied from tank 10, opens ball valve 6; with an in-rush of air, while exhausting the air holding it shut thru the air solenoid valve (3).

As the opening of ball valve 6 occurs, fluid trapped within cylinder 7 is released through the force of the spring located behind the piston of shaft 7a (FIG. 3). The fluid is then returned to tank 9, through fluid line 41. During this action of release, electrical brush 25 passes its charged electrical contact, bushing 22. As the circuit is broken shifting of the piston within air solenoid valve 3 occurs; exhausting the trapped air holding ball valve 6 open, thru another exhaust port within the air solenoid valve, closing valve 6 through the reverse in-rush of air from tank 10.

Manual control of the mirror's inward or outward motions may also be operated through the power switch, and circuit override 1b; FIG. 1, located at the driver's reach on the dash.

While the particular automated angulating mirror here-in shown, and described in full detail is fully capable of attaining the objects; and providing the advantages here-in-before stated of the presently preferred embodiment of the invention, and that no limitations are intended to the details of construction or design here-in shown other than as defined in the appended claims, which form part of this disclosure.

I claim:

1. An actuating device for automatically controlling the position of a movable mounted mirror in response to a relative positioning of the vehicle with respect to a trailer pivotably mounted to the vehicle about and axis, said device comprising;

mirror actuating means comprising a motor and means for powering hydraulic fluid from a reservoir;

a hydraulic actuated electrical piston and cylinder arrangement, said piston being directly connected to said mirror;

a first electric power source for powering said motor;

a check valve in direct hydraulic connection to said reservoir;

a first solenoid valve in direct hydraulic connection to said hydraulic actuated electrical cylinder;

said first solenoid valve for directional flow control of said hydraulic fluid between said reservoir and said hydraulic actuated electrical cylinder;

a first switching means for opening said first solenoid valve and for closing said check valve and causing flow of said hydraulic fluid to said hydraulic actuated electrical cylinder whereby said piston is moved to directly move said mirror;

a second switching means for closing said first solenoid valve, causing said hydraulic fluid to open said check valve to return hydraulic fluid to said reservoir;

a third switching means for opening a second solenoid valve, releasing said hydraulic fluid from said hydraulic actuated electrical cylinder to said reservoir;

a fourth switching means for closing said second solenoid valve;

a second electrical power source for said first, second, third and fourth switching means;

and a circuit board for controlling current between all said switching means and said first and said second solenoid valves.

2. The invention as defined in claim 1 wherein said first switching means comprises a plurality of switches each including a contact positioned concentrically about the pivot axis, one or more of the contacts being secured to the trailer or vehicle, and a pivot member having means for closing each switch, said pivot member being secured to the other of the trailer or the vehicle.

3. The invention as defined in claim 1 wherein said third switching means comprises a plurality of switches each including a contact positioned concentrically about the pivot axis, one or more of the contacts being secured to the trailer or vehicle, and a pivot member having means for closing each switch, said pivot member being secured to the other of the trailer or the vehicle.

4. The invention as defined in claim 1 wherein said hydraulic actuated electrical cylinder is in electrical series with said first and third switching means through said circuit board.

5. The invention as defined in claim 4 wherein said first switching means is connected to one of two electrical contacts, parallel to each other, insulated one from the other within said hydraulic actuated electrical cylinder, and said third switching means is connected to the other of said two electrical contacts with a third electrical contact being located adjacent to one of the two electrical contacts for creating continuity in said electrical series.

6. The invention as defined in claim 1 wherein said hydraulic actuated electrical cylinder further comprising means to return hydraulic fluid through itself to said reservoir, upon malfunction of either of said first or second solenoid valves.

7. The invention as defined in claim 1 and further comprising manual override means for causing flow of hydraulic fluid to or from said hydraulic actuated electrical cylinder to move said mirror.

* * * * *